US011677542B2

(12) United States Patent
Vaughn et al.

(10) Patent No.: US 11,677,542 B2
(45) Date of Patent: Jun. 13, 2023

(54) AD-HOC SMART CONTRACT GENERATION IN A BLOCKCHAIN

(71) Applicant: International Business Machines Corporation, Armonk, NY (US)

(72) Inventors: Garfield Vaughn, Southbury, CT (US); Tetiana Iakovenko, Brooklyn, NY (US); Marcelo A. Martins, Markham (CA); Nitin Gaur, Roundrock, TX (US); Rolando Franco, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 15/982,829

(22) Filed: May 17, 2018

(65) Prior Publication Data
US 2019/0356471 A1 Nov. 21, 2019

(51) Int. Cl.
*H04L 9/06* (2006.01)
*H04L 9/32* (2006.01)
*G06F 21/60* (2013.01)

(52) U.S. Cl.
CPC .......... *H04L 9/0637* (2013.01); *G06F 21/602* (2013.01); *H04L 9/3265* (2013.01)

(58) Field of Classification Search
CPC . H04L 9/0637; H04L 9/3265; H04L 2209/38; G06F 21/602
See application file for complete search history.

(56) References Cited

U.S. PATENT DOCUMENTS

| 7,124,302 | B2 | 10/2006 | Ginter et al. | |
| 10,417,217 | B2 * | 9/2019 | Pierce | H04L 9/3268 |
| 2015/0379510 | A1 | 12/2015 | Smith | |
| 2017/0011460 | A1 | 1/2017 | Molinari et al. | |
| 2017/0046526 | A1 * | 2/2017 | Chan | G06Q 20/4016 |
| 2017/0085545 | A1 | 3/2017 | Lohe et al. | |
| 2017/0287090 | A1 * | 10/2017 | Hunn | G06Q 50/18 |
| 2018/0096360 | A1 * | 4/2018 | Christidis | G06Q 20/02 |
| 2018/0123882 | A1 * | 5/2018 | Anderson | H04L 43/16 |
| 2019/0332430 | A1 * | 10/2019 | Qiu | G06F 16/1837 |

FOREIGN PATENT DOCUMENTS

| CN | 105809062 A | 7/2016 |
| CN | 106778329 A | 5/2017 |

OTHER PUBLICATIONS

C. Clack et al., "Smart Contract Templates: foundations, design landscape and research directions." Aug. 4, 2016 (Revised Mar. 15, 2017). https://arxiv.org/abs/1608.00771. [Accessed Oct. 23, 2017].

(Continued)

*Primary Examiner* — Daniel B Potratz

(57) ABSTRACT

An example operation may include one or more of identifying blockchain transactions for a particular blockchain, identifying blockchain transaction metrics from the blockchain transactions, determining whether the blockchain transaction metrics require a change to current blockchain operating rules, and when the blockchain transaction metrics require the change to the current blockchain operating rules, modifying the current blockchain operating rules.

20 Claims, 10 Drawing Sheets

(56) References Cited

OTHER PUBLICATIONS

J. Stark. "Making Sense of Blockchain Smart Contracts." https://www.coindesk.com/making-sense-smart-contracts/ [Accessed Oct. 23, 2017].

Staples et al., "Risks and Opportunities for Systems Using Blockchain and Smart Contracts," (May 2017) Data61 (CSIRO), Sydney, https://doi.org/10.4225/08/596e5ab7917bc.

Anonymous, IPCOM000248083D, "System and Method for Software Asset Management Powered by Blockchain and Smart Contracts," ip.com, Oct. 24, 2016.

Anonymous, IPCOM000250922D, "System and Method of secure and permissioned sharing of Cognitive Patterns in a Marketplace." ip.com, Sep. 14, 2017.

Q. Dupont, B. Maurer, "Ledgers and Law in the Blockchain." King's Review, Jun. 23, 2015. Preprint, http://kingsreview.co.uk/articles/ledgers-and-law-in-the-blockchain/http://kingsreview.co.uk/magazine/blog/2015/06/23/ledgers-and-law-in-the-blockchain.

Satyavolu and Sangamnerkar, "Blockchain's Smart Contracts: Driving the Next Wave of Innovation Across Manufacturing Value Chains." Cognizant 20-20 Insights Whitepaper. Jun. 2016.

* cited by examiner

AD-HOC SMART CONTRACT GENERATION IN A BLOCKCHAIN

TECHNICAL FIELD

This application generally relates to dynamic smart contract creation, and more particularly, to dynamic creation of smart contracts based on ongoing blockchain activity among dynamic activities conducted between blockchain peers.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, smart contracts are static and do not reflect the dynamic nature of a blockchain, such as new members, types of transactions, relationships, standards, agreements and the dynamic nature of each of those considerations over time. The nature of bilateral relationships, either due to bilateral agreements or due to changes in a market dynamic, demands dynamic updates to a network of peers and their respective decisions and agreements among one another. As a blockchain network evolves and grows, and as new participants are added/or removed, the dynamics of the network changes invoke bi-lateral and multi-lateral relationships to emerge. Currently, static smart contracts and corresponding blockchain architectures do not capture the nature of blockchain powered networks which can be ephemeral.

SUMMARY

One example embodiment may provide a method that includes at least one of identifying a plurality of blockchain transactions for a particular blockchain, identifying one or more blockchain transaction metrics from the plurality of blockchain transactions, determining whether the one or more blockchain transaction metrics require a change to one or more current blockchain operating rules, and when the one or more blockchain transaction metrics require the change to the one or more current blockchain operating rules, modifying the one or more current blockchain operating rules.

Another example embodiment may include an apparatus that includes a processor configured to identify a plurality of blockchain transactions for a particular blockchain, identify one or more blockchain transaction metrics from the plurality of blockchain transactions, determine whether the one or more blockchain transaction metrics require a change to one or more current blockchain operating rules, and when the one or more blockchain transaction metrics require the change to the one or more current blockchain operating rules, modify the one or more current blockchain operating rules.

Yet another example embodiment may provide a non-transitory computer readable storage medium configured to store instructions that when executed cause a processor to perform at least one of identifying a plurality of blockchain transactions for a particular blockchain, identifying one or more blockchain transaction metrics from the plurality of blockchain transactions, determining whether the one or more blockchain transaction metrics require a change to one or more current blockchain operating rules, and when the one or more blockchain transaction metrics require the change to the one or more current blockchain operating rules, modifying the one or more current blockchain operating rules.

DETAILED DESCRIPTION

Figure 1:
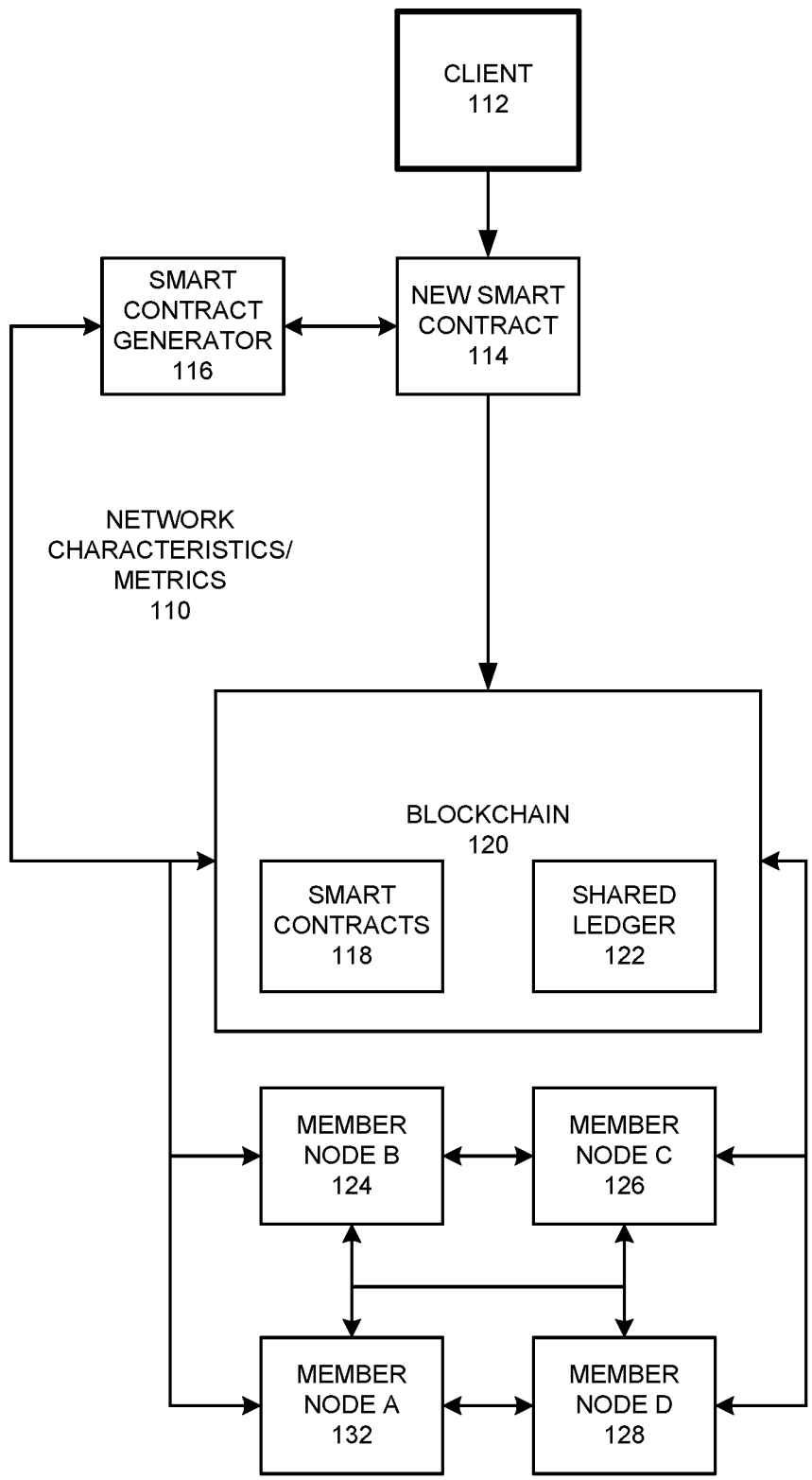
FIG. 1 illustrates a network configuration of a dynamic smart contract generation and blockchain modification process for a blockchain network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide an intelligent way to discern and determine the aligned relationship that emerge in a truly digitally driven market place enabled by blockchain. For example, with established members of a blockchain network, transactions continuously arise and corresponding assets move from one party to another, and the inevitable smart contracts which execute may or may not be currently optimal for the recent activity being conducted on the blockchain.

One example model may provide optimal blockchain arrangements for advertisement technology and media which includes co-relationships between ad-type/consumer, type/product and/or media channels based on the ephemeral nature of ever changing consumer behavior and creating an ad hoc co-creation model among the blockchain peers to accommodate such a network. Another example may be with the private equity/investment vehicle market, which includes co-relationships between investment vehicles and investment objectives, such as development projects, oversees banking, impact lending, etc.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1 illustrates a network configuration of a dynamic smart contract generation process on a blockchain, according to example embodiments. Referring to FIG. 1, the network configuration 100 provides a client device 112 which may submit one or blockchain transactions to the blockchain 120. The transactions are subject to terms of any existing smart contracts 118 and/or new smart contracts 114. The blockchain 120 stores the smart contracts 118 and the ledger 122. The members of the blockchain, such as the peer nodes 124, 126, 128 and 132 may conduct asset transfers, and perform consensus regarding new transactions, among other blockchain operations. The smart contract generator 116 represents an entity that is responsible for compiling received network characteristics/metrics 110 associated with the current state of the blockchain network. The information may include dynamically identified information, such as a recent transaction input, a number transactions, a number of existing relationships, a number of channels and/or a number of interactions among peers and members, a network query type performed, etc. Those metrics may be identified over a period of time to create a blockchain baseline that is compiled by the smart contract generator 116 to determine which smart contract rules to maintain, preferred terms of consent and approval, and other metrics to ensure certainty via the consensus of the peers.

Measuring bi-lateral and multi-lateral relationships among peers may provide the information necessary to customize and update smart contracts and other relationship amenities in the blockchain. In another example, the transaction inputs, such as binary and/or workflow inputs may offer additional information necessary to update and customize the smart contract configuration and define relationships among peers. Other metrics may include the transaction inputs, such as binary vs. workflow, a number of interactions, such as transactions with various participants, a number of channel or sub-channel subscriptions that determine bi-lateral and multi-lateral relationships, and a number of transactions, participated or processed, based on role miner/minter/orderer, etc.

In one example method of operation, a process for making dynamic customized changes to a blockchain network may include collecting metric information of recent transactions over a defined period of time. Information regarding the transactions may be identified and placed in a spreadsheet, graph or other data realization tool to identify the relationships in the network among members of the blockchain. One approach to identifying information may be a linear approach which is purely based on a number of transactions and a duration of those transactions. Another approach to analyzing the transactions may be a proportionality analysis which identifies a size of transactions (i.e., bytes) and a frequency of transactions over a period of time. Yet another approach may be a non-linear approach which is based on age of the blockchain, the transactions, recent changes to agreement terms for upcoming and recent transactions. Still yet a further example embodiment may include an explicit relationship, which is initiated by participants for more favorable or off-chain relationships. The analysis may be repeated every time a change in the membership to the blockchain occurs so as to remove and add new transactions. For example, a new peer member, a new type of blockchain transaction appearing in the transaction pool, and/or new client members contributing new transactions.

The smart contract generator entity 116 should have a mechanism to configure prioritization in the event of a plurality of relationship graphs that may exist. For example, explicit relationships should obtain priority over linear relationships and/or proportional relationships should receive priority over non-linear relationships, etc. The rules could be general rules agreed to by the network members and enforced by the network operators (i.e., peers). The role of consensus may be separate from other relationships (i.e., assets elements). Another approach may be to include the dominant or preferred business networks identified by comparing those entities of the blockchain with other networks of other participants. The most valuable members and their transactions may receive priority when dynamically changing the rules, smart contracts or other blockchain operational elements. The respective smart contracts relationships identified as important or more relevant may be weighted or designated and sent to the smart contract generator to generate preferred contracts with preferred terms for consent and approval while utilizing a same consensus mechanism.

As additional entities join the blockchain membership group, the entities offer additional value to the blockchain network, such as lower operational costs and/or faster networks. For example, consider a blockchain network with a million transactions a year, the new members may increase the number of transactions as well as the number of potential candidates for engaging in new smart contract-based dealings. The agreements are generally bilateral, meaning two parties to a deal, as new members join, the agreements may become increasingly multilateral type relationships, which can include more than two entities. The smart contracts must adhere to the multilateral relationship model with new smart contracts to govern the movement of assets, derivatives, etc. According to example embodiments, the smart contracts become dynamic and may change certain operational parameters, such as previous transaction volume thresholds, entity amounts, etc.

Figure 2A:
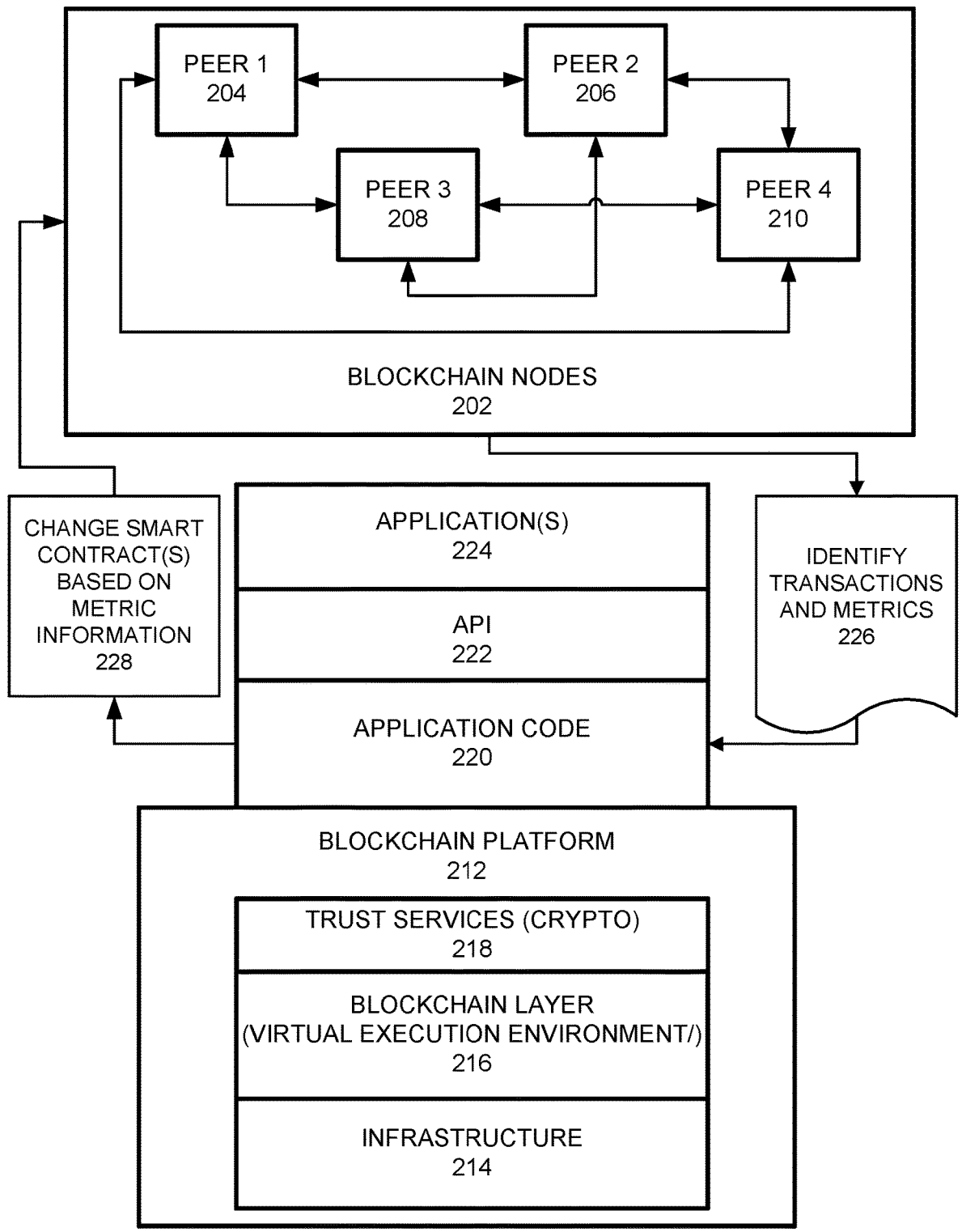
FIG. 2A illustrates an example peer node blockchain architecture configuration for performing blockchain modification operations, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, in one example, certain blockchain transactions may be identified and analyzed for network metric evaluation 226. Once the transaction(s) is identified and analyzed changes to the smart contracts 228 may be generated to modify the blockchain network configuration for subsequent blockchain processing.

Figure 2B:
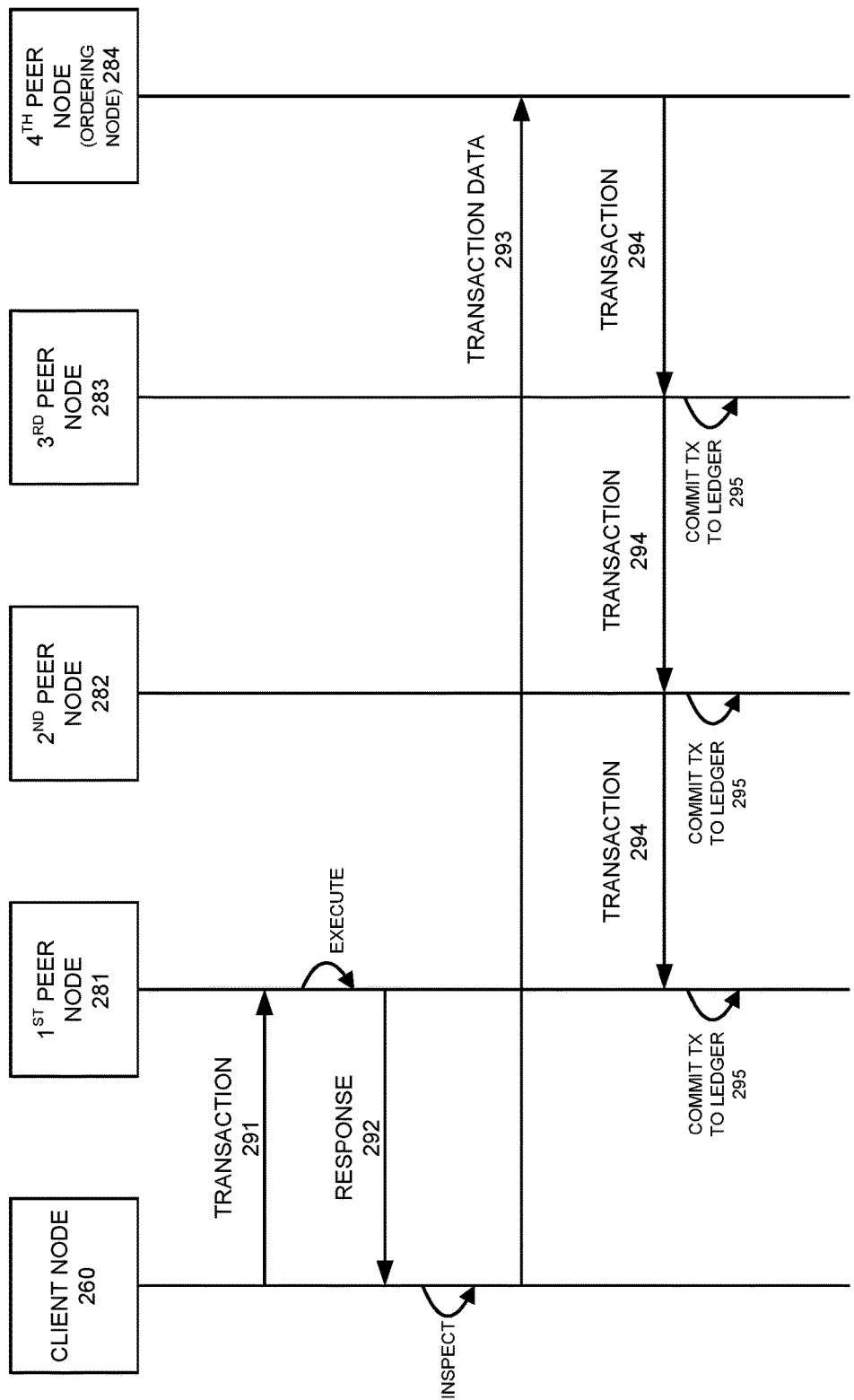
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
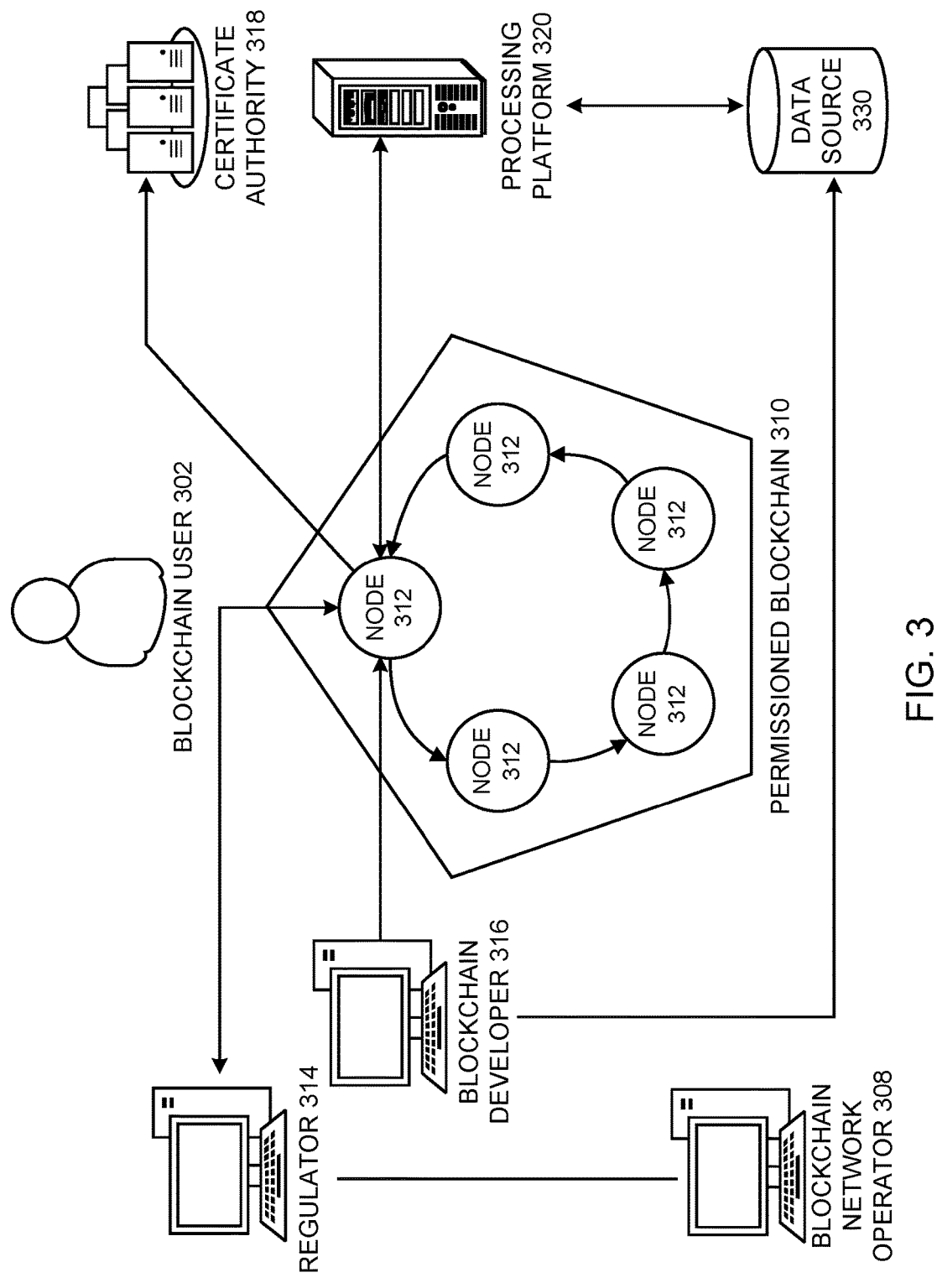
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
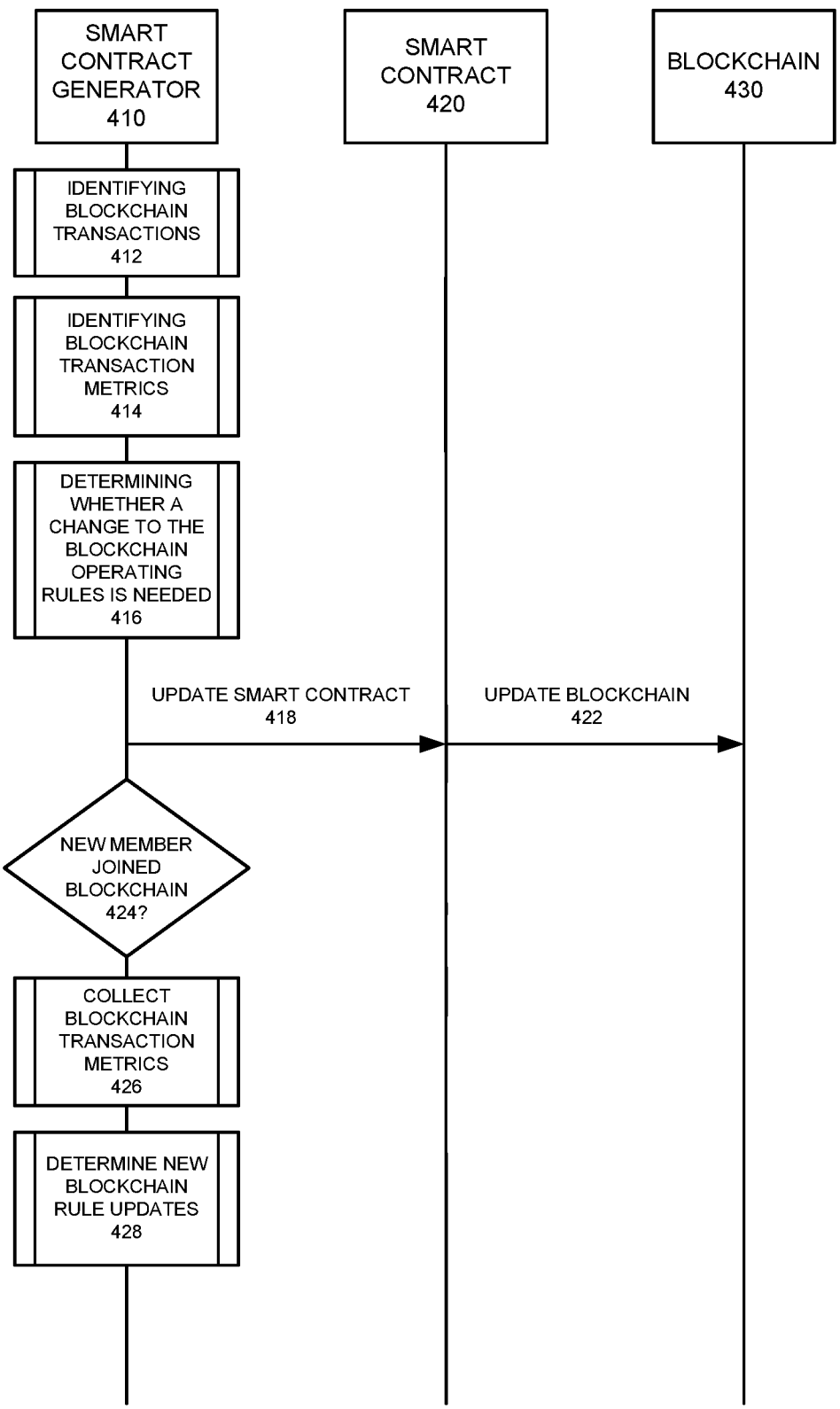
FIG. 4 illustrates a system messaging diagram for blockchain rule modification management, according to example embodiments.

FIG. 4 illustrates a system messaging diagram for blockchain rule modification management, according to example embodiments. Referring to FIG. 4, the configuration 400 includes a smart contract generator 410, a smart contract 420 and a blockchain 430. The blockchain transaction data may be identified as one or more transactions 412, which are used as the basis for identifying metric information 414 and determining whether a change to the blockchain operating rules is needed 416 depending on the metric data. The smart contract may be updated to reflect such changes 418 and the blockchain may be updated 422 accordingly to include the updated smart contract. The smart contract generator may determine whether a new member has joined the blockchain 424 by identifying such a party in the blockchain transactions. If so, the blockchain transactions metrics 426 are collected and a new rule(s) is established to govern the blockchain members, peers, transactions and other blockchain criteria 428.

Figure 5A:
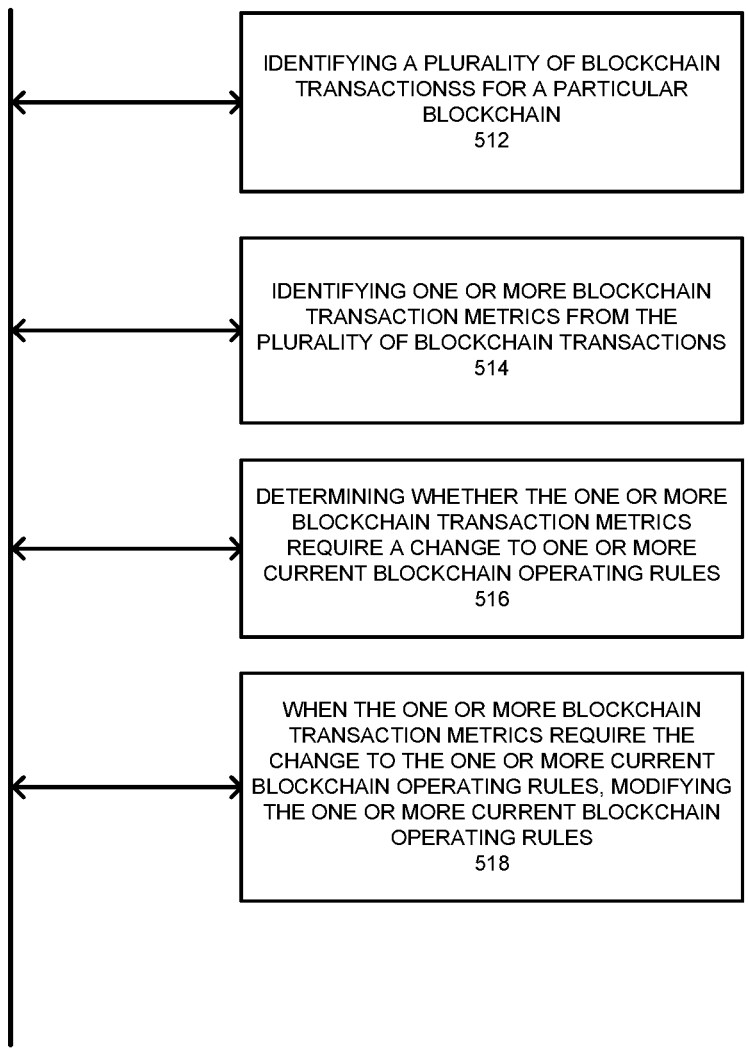
FIG. 5A illustrates a flow diagram of an example method of blockchain rule modification management, according to example embodiments.

FIG. 5A illustrates a flow diagram of an example method of blockchain rule modification management, according to example embodiments. Referring to FIG. 5A, the method example 500 may include identifying a plurality of blockchain transactions for a particular blockchain 512, identifying one or more blockchain transaction metrics from the plurality of blockchain transactions 514, determining whether the one or more blockchain transaction metrics require a change to one or more current blockchain operating rules 516, and when the one or more blockchain transaction metrics require the change to the one or more current blockchain operating rules, modifying the one or more current blockchain operating rules 518. The method may also include modifying the one or more current blockchain operating rules comprises creating a new smart contract and sending the new smart contract with the modified one or more current blockchain operating rules to the blockchain. The one or more blockchain transactions metrics include one or more of a majority party to the plurality of blockchain transactions, a size of the plurality of blockchain transactions, a frequency over a defined period of time of the plurality of blockchain transactions, a number of the plurality of blockchain transactions, a newly identified party, not previously identified, to one or more of the plurality of blockchain transactions, and an established prioritized party to one or more of the plurality of blockchain transactions. The method may also include identifying a plurality of blockchain transactions for a particular blockchain comprises identifying the plurality of blockchain transactions over a defined period of time, identifying a new member has joined the blockchain network, and responsive to identifying the new member has joined the blockchain network, collecting the identified one or more blockchain transaction metrics. The method may further include identifying an existing member has quit the blockchain network, and responsive to identifying the existing member has quit the blockchain network, collecting the identified one or more blockchain transaction metrics. Also, the determining whether the one or more blockchain transaction metrics require a change to one or more current blockchain operating rules may include comparing the one or more blockchain transaction metrics to one or more blockchain operating rule thresholds to determine whether the one or more blockchain transaction metrics exceed the one or more blockchain operating rule thresholds.

Figure 5B:
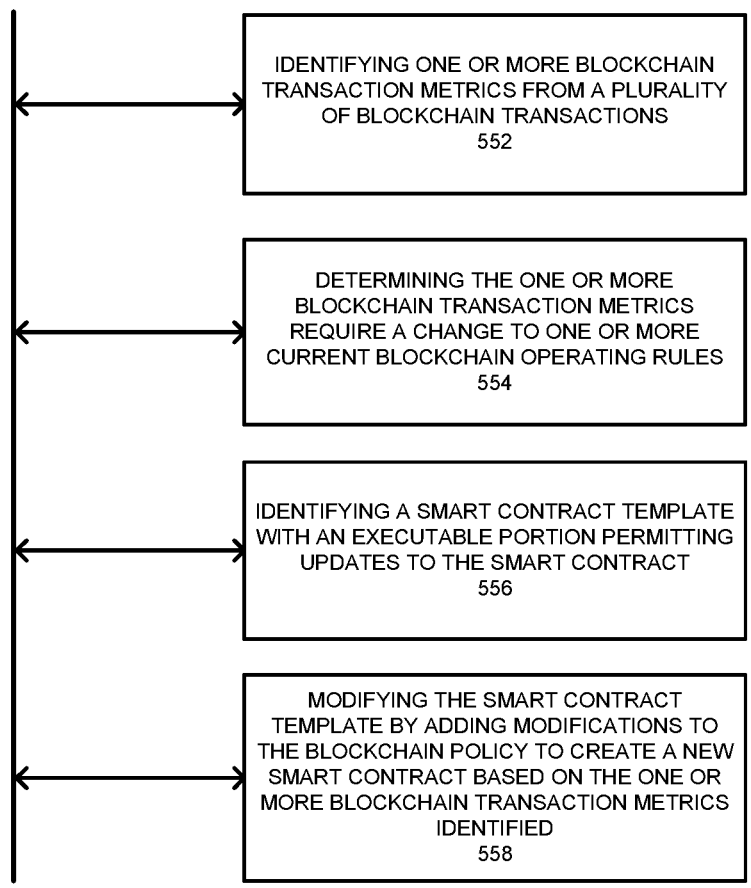
FIG. 5B illustrates a flow diagram of another example method of blockchain rule modification management, according to example embodiments.

FIG. 5B illustrates a flow diagram of another example method of blockchain rule modification management, according to example embodiments. The method 550 may include identifying one or more blockchain transaction metrics from a plurality of blockchain transactions 552, determining the one or more blockchain transaction metrics require a change to one or more current blockchain operating rules 554, identifying a smart contract template with an executable portion permitting updates to the smart contract 556, and modifying the smart contract template by adding modifications to the blockchain policy to create a new smart contract based on the one or more blockchain transaction metrics identified 558.

In addition to making dynamic changes to a smart contract to update a blockchain's operational policies and rules, a smart contract template may be circulated among peers and other blockchain members to create a medium for the needed changes to be inserted in an executable portion that is receptive to the changes. The changes may be based on policies and current operating conditions identified from the blockchain transaction metric data.

Figure 6A:
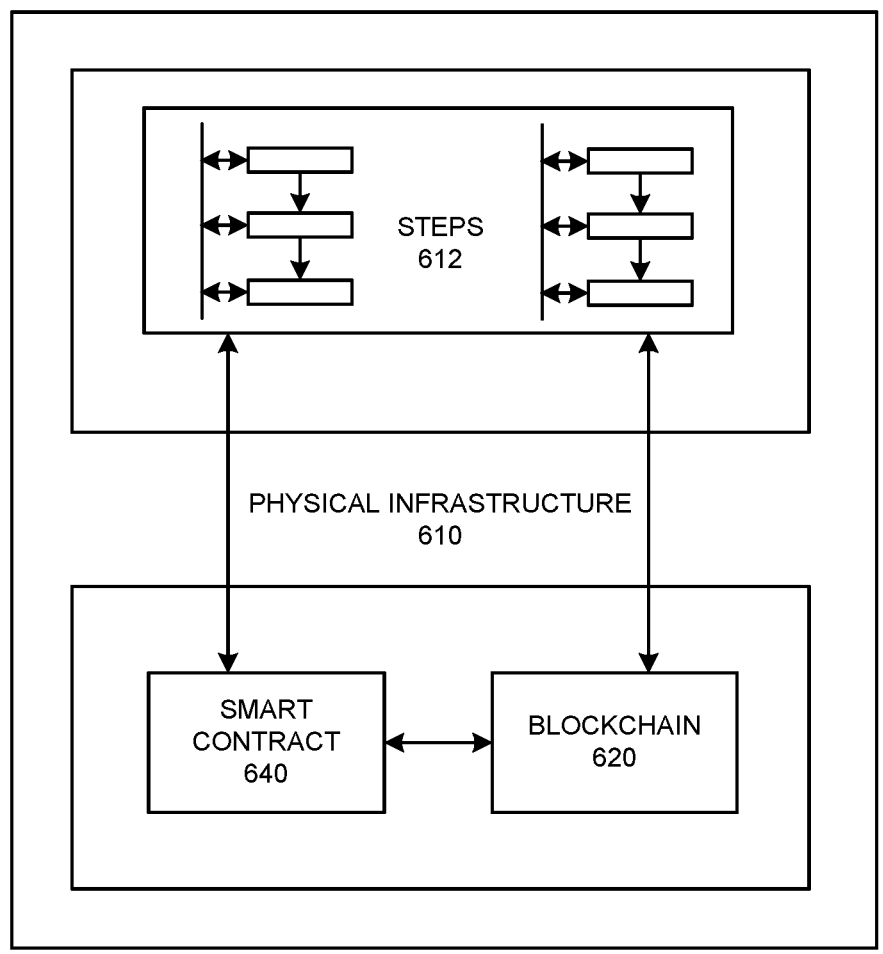
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
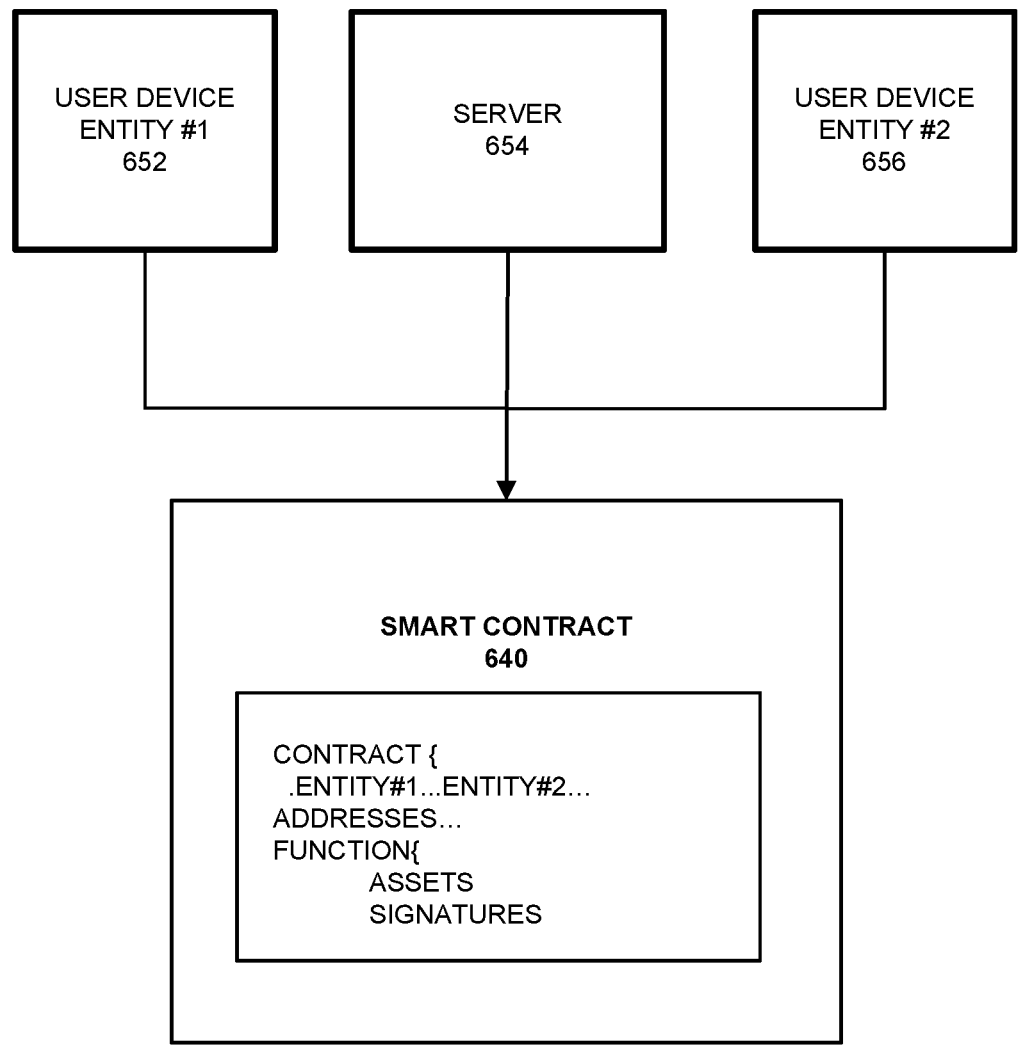
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
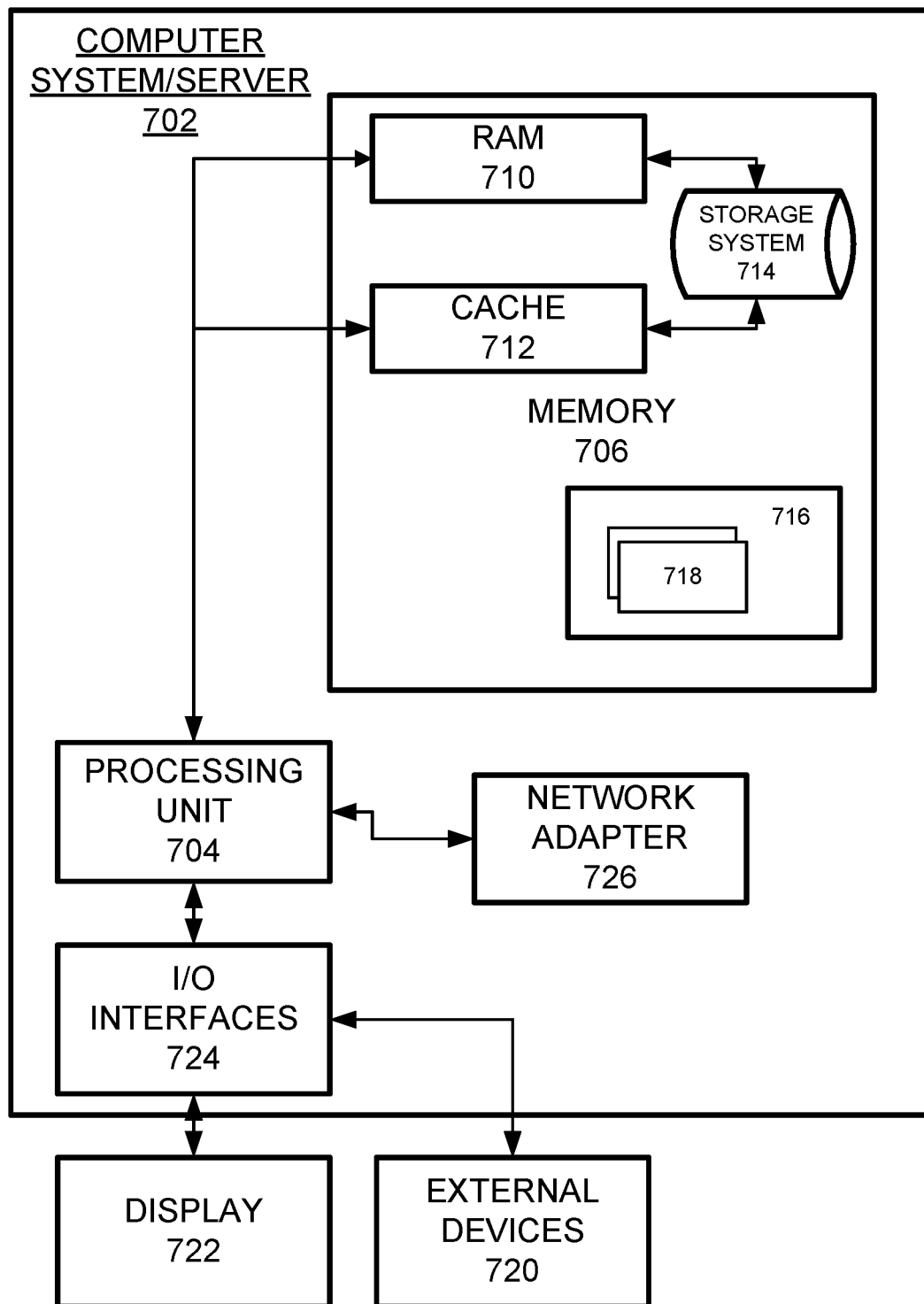
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying, via a hardware-implemented smart contract generator, a plurality of blockchain transactions of a blockchain;
   collecting, via the hardware-implemented smart contract generator, one or more blockchain transaction metrics from the plurality of blockchain transactions;
   identifying, via the hardware-implemented smart contract generator, relationships between members of the blockchain based on the one or more blockchain transaction metrics, wherein the relationships includes two or more different types of relationships, each having different blockchain operating rules, wherein the types of relationships are: an explicit relationship, a linear relationship, a nonlinear relationship, and a proportional relationship;
   prioritizing, via the hardware-implemented smart contract generator, the relationships based on the type of relationship;
   determining, via the hardware-implemented smart contract generator, that the one or more blockchain transaction metrics require a change to one or more current blockchain operating rules of a smart contract stored in the blockchain based on a comparison of the one or more blockchain transaction metrics to a baseline generated by the smart contract generator;
   modifying, via the hardware-implemented smart contract generator, the one or more current blockchain operating rules without changing a current consensus mechanism, wherein the modifying is based on the determining and on the prioritized relationships to generate modified blockchain operating rules; and
   storing, via the hardware-implemented smart contract generator, a modified smart contract, including the modified blockchain operating rules, on the blockchain.

2. The method of claim 1, wherein the modifying the one or more current blockchain operating rules comprises:
   creating a new smart contract; and
   sending the new smart contract with the modified one or more current blockchain operating rules to the blockchain.

3. The method of claim 1, wherein the one or more blockchain transactions metrics comprise:
   one or more of a majority party to the plurality of blockchain transactions,
   a size of the plurality of blockchain transactions,
   a frequency over a defined period of time of the plurality of blockchain transactions,
   a number of the plurality of blockchain transactions, a newly identified party, not previously identified, to one or more of the plurality of blockchain transactions, and
   an established prioritized party to one or more of the plurality of blockchain transactions.

4. The method of claim 1, wherein the identifying a plurality of blockchain transactions for a particular blockchain comprises:
   identifying the plurality of blockchain transactions over a defined period of time.

5. The method of claim 1, further comprising:
   identifying a new member has joined the blockchain network; and
   responsive to identifying the new member has joined the blockchain network, collecting the identified one or more blockchain transaction metrics.

6. The method of claim 1, further comprising:
   identifying that an existing member has quit the blockchain network; and
   responsive to identifying the existing member has quit the blockchain network, collecting the identified one or more blockchain transaction metrics.

7. The method of claim 1, wherein the determining that the one or more blockchain transaction metrics require a change to one or more current blockchain operating rules further comprises:
   determining that the one or more blockchain transaction metrics exceed the one or more blockchain operating rule thresholds based on a comparison of the one or more blockchain transaction metrics to one or more blockchain operating rule thresholds.

8. A smart contract generator, apparatus comprising:
   a hardware-implemented processor configured to:
   identify a plurality of blockchain transactions for a particular blockchain;
   collect one or more blockchain transaction metrics from the plurality of blockchain transactions;
   identify relationships between members of the blockchain based on the one or more blockchain transaction metrics, wherein the relationships includes two or more different types of relationships, each having different blockchain operating rules, wherein the types of relationships are: an explicit relationship, a linear relationship, a nonlinear relationship, and a proportional relationship;
   prioritize the relationships based on the type of relationship;
   determine that the one or more blockchain transaction metrics require a change to one or more current blockchain operating rules of a smart contract stored in the blockchain based on a comparison of the one or more blockchain transaction metrics to a baseline generated by the smart contract generator;
   modify the one or more current blockchain operating rules without changing a current consensus mechanism, wherein the modification is based on the determination and on the prioritized relationships to generate modified blockchain operating rules; and
   store a modified smart contract, including the modified blockchain operating rules, on the blockchain.

9. The apparatus of claim 8, wherein the processor being configured to modify the one or more current blockchain operating rules further comprises the processor being configured to:
   create a new smart contract; and
   send the new smart contract with the modified one or more current blockchain operating rules to the blockchain.

10. The apparatus of claim 8, wherein the one or more blockchain transactions metrics comprise:
    one or more of a majority party to the plurality of blockchain transactions,
    a size of the plurality of blockchain transactions,
    a frequency over a defined period of time of the plurality of blockchain transactions, a number of the plurality of blockchain transactions, a newly identified party, not previously identified, to one or more of the plurality of blockchain transactions, and an established prioritized party to one or more of the plurality of blockchain transactions.

11. The apparatus of claim 8, wherein the processor being configured to identify a plurality of blockchain transactions for a particular blockchain further comprises the processor being configured to:

identify the plurality of blockchain transactions over a defined period of time.

12. The apparatus of claim 8, wherein the processor is further configured to:

identify a new member has joined the blockchain network; and responsive to the new member being identified as having joined the blockchain network, collect the identified one or more blockchain transaction metrics.

13. The apparatus of claim 8, wherein the processor is further configured to:

identify an existing member has quit the blockchain network; and responsive to the existing member being identified as having quit the blockchain network, collect the identified one or more blockchain transaction metrics.

14. The apparatus of claim 8, wherein the processor being configured to determine that the one or more blockchain transaction metrics require a change to one or more current blockchain operating rules further comprises via the processor being configured to:

determine that the one or more blockchain transaction metrics exceed the one or more blockchain operating rule thresholds based on a comparison of the one or more blockchain transaction metrics to one or more blockchain operating rule thresholds.

15. A non-transitory computer readable storage medium of a smart contract generator, the non-transitory computer readable storage medium being configured to store one or more instructions that when executed by a processor cause the processor to perform:

identifying a plurality of blockchain transactions of a blockchain;

collecting one or more blockchain transaction metrics from the plurality of blockchain transactions;

identifying relationships between members of the blockchain based on the one or more blockchain transaction metrics, wherein the relationships includes two or more different types of relationships, each having different blockchain operating rules, wherein the types of relationships are: an explicit relationship, a linear relationship, a nonlinear relationship, and a proportional relationship;

prioritizing the relationships based on the type of relationship;

determining that the one or more blockchain transaction metrics require a change to one or more current blockchain operating rules of a smart contract stored in the blockchain based on a comparison of the one or more blockchain transaction metrics to a baseline generated by the smart contract generator;

modifying the one or more current blockchain operating rules without changing a current consensus mechanism, wherein the modifying is based on the determining and on the prioritized relationships to generate modified blockchain operating rules; and storing a modified smart contract, including the modified blockchain operating rules, on the blockchain.

16. The non-transitory computer readable storage medium of claim 15, wherein the modifying the one or more current blockchain operating rules comprises:

creating a new smart contract; and sending the new smart contract with the modified one or more current blockchain operating rules to the blockchain.

17. The non-transitory computer readable storage medium of claim 15, wherein the one or more blockchain transactions metrics comprise:

one or more of a majority party to the plurality of blockchain transactions, a size of the plurality of blockchain transactions, a frequency over a defined period of time of the plurality of blockchain transactions, a number of the plurality of blockchain transactions, a newly identified party, not previously identified, to one or more of the plurality of blockchain transactions, and an established prioritized party to one or more of the plurality of blockchain transactions.

18. The non-transitory computer readable storage medium of claim 15, wherein the identifying a plurality of blockchain transactions for a particular blockchain comprises:

identifying the plurality of blockchain transactions over a defined period of time.

19. The non-transitory computer readable storage medium of claim 15, wherein the one or more instructions are further configured to cause the processor to perform:

identifying a new member has joined the blockchain network; and responsive to identifying the new member has joined the blockchain network, collecting the identified one or more blockchain transaction metrics.

20. The non-transitory computer readable storage medium of claim 15, wherein the one or more instructions are further configured to cause the processor to perform:

identifying an existing member has quit the blockchain network; and responsive to identifying the existing member has quit the blockchain network, collecting the identified one or more blockchain transaction metrics, and determining that the one or more blockchain transaction metrics exceed the one or more blockchain operating rule thresholds based on a comparison of the one or more blockchain transaction metrics to one or more blockchain operating rule thresholds.

* * * * *